(12) United States Patent
Ikeda et al.

(10) Patent No.: US 9,668,062 B2
(45) Date of Patent: May 30, 2017

(54) CONDENSER TYPE ELECTROACOUSTIC TRANSDUCER

(71) Applicants: Tatsuya Ikeda, Tokyo (JP); Hiroshi Akino, Tokyo (JP)

(72) Inventors: Tatsuya Ikeda, Tokyo (JP); Hiroshi Akino, Tokyo (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 0 days.

(21) Appl. No.: 14/956,438

(22) Filed: Dec. 2, 2015

(65) Prior Publication Data

US 2016/0165356 A1    Jun. 9, 2016

(30) Foreign Application Priority Data

Dec. 4, 2014    (JP) ................. 2014-246248

(51) Int. Cl.
*H04R 25/00*    (2006.01)
*H04R 19/01*    (2006.01)
*H04R 19/00*    (2006.01)
*H04R 23/00*    (2006.01)
*H04R 31/00*    (2006.01)
*H04R 19/04*    (2006.01)
*H01G 7/02*    (2006.01)

(52) U.S. Cl.
CPC ......... *H04R 19/016* (2013.01); *H04R 19/005* (2013.01); *H04R 19/04* (2013.01); *H04R 23/006* (2013.01); *H04R 31/003* (2013.01); *H01G 7/02* (2013.01); *H04R 2201/003* (2013.01); *H04R 2499/11* (2013.01)

(58) Field of Classification Search
CPC ...... H04R 1/086; H04R 19/005; H04R 19/01; H04R 19/013; H04R 19/016; H04R 19/04; H04R 23/006; H04R 31/006; H04R 2201/003; H04R 31/003
USPC ....... 381/113, 116, 355, 356, 369, 173, 175, 381/190, 191; 29/25.41, 25.42
See application file for complete search history.

(56) References Cited

U.S. PATENT DOCUMENTS

| | | | | |
|---|---|---|---|---|
| 3,896,274 A * | 7/1975 | Fraim | ............... | H04R 19/01 307/400 |
| 7,346,179 B1 * | 3/2008 | Bobisuthi | ............ | H04R 1/086 381/174 |
| 2006/0145570 A1 * | 7/2006 | Ohbayashi | ........... | H04R 19/005 310/322 |

FOREIGN PATENT DOCUMENTS

| | | |
|---|---|---|
| JP | 62-39880 | 8/1987 |
| JP | 9-215093 | 8/1997 |
| JP | 2007-281669 | 10/2007 |

* cited by examiner

*Primary Examiner* — Huyen D Le
(74) *Attorney, Agent, or Firm* — Whitham, Curtis & Cook, P.C.

(57) ABSTRACT

A condenser type electroacoustic transducer includes a diaphragm, a fixed electrode having a surface facing the diaphragm, and a dielectric disposed in a partial region on the surface of the fixed electrode.

15 Claims, 10 Drawing Sheets

CONDENSER TYPE ELECTROACOUSTIC TRANSDUCER

TECHNICAL FIELD

The present invention relates to a condenser type electroacoustic transducer.

BACKGROUND ART

Capacitive transducers convert variations in capacitance generated between a diaphragm and a fixed electrode to electrical signals. An example of the condenser type electroacoustic transducer is an electret condenser microphone unit. A condenser microphone unit experiences a significant decrease in sensitivity at harmonic frequencies of the resonance frequencies of the diaphragm vibrated in a low order vibration mode. Thus, a condenser microphone unit should be designed to have a frequency band of sound collection below the resonance frequency of the diaphragm.

High-resolution audio sources, which are also referred to as "high-resolution audio," have recently been in demand. The maximum frequency of audio sources recorded on typical CDs is 22.05 kHz. In contrast, the maximum frequency of audio sources in high-resolution is 40 kHz or higher. Thus, a microphone supporting high-resolution audio should be responsive to a frequency of 40 kHz or higher. Unfortunately, conventional condenser type electroacoustic transducers cannot readily achieve a resonance frequency of 40 kHz or higher because of the tension characteristics of the diaphragms. If the dimensions of the diaphragm are reduced to shift the resonance frequency, the driving force is reduced. Thus, conventional condenser type electroacoustic transducers cannot achieve a sufficiently high S/N ratio because an increase in resonance frequency to support high resolution audio sources weakens the output signal.

There is a demand for a condenser microphone unit that can reduce a decrease in sensitivity at harmonic frequencies of the resonance frequency of the diaphragm and stably collect sound in high-frequency bands.

For example, an electret capacitive transducer is disclosed that has an electret layer having a surface charge distribution in which the central area has a smaller charge than that of the peripheral area (for example, refer to Japanese Examined Patent Publication No. 62-39880). Another speaker is also disclosed that includes a circular diaphragm attached to a circular sub-diaphragm at a junction such that the outer circumferential section of the circular sub-diaphragm is connected to the circular diaphragm at a region including the anti-node of a secondary resonance mode of the circular diaphragm (for example, refer to Japanese Unexamined Patent Application Publication No. 2007-281669).

A piezoelectric speaker is disclosed that includes a diaphragm including multiple curved surfaces disposed parallel to each other and including a piezoelectric element attached to the junction of the diaphragm (for example, refer to Japanese Unexamined Patent Application Publication No. 9-215093).

SUMMARY OF INVENTION

Technical Problem

An object of the present invention is to provide a condenser type electroacoustic transducer that can reduce a decrease in sensitivity at harmonic frequencies of the resonance frequency of a diaphragm.

Solution to Problem

A condenser type electroacoustic transducer according to the present invention includes a diaphragm, a fixed electrode having a surface facing the diaphragm, and a dielectric disposed in a partial region on the surface of the fixed electrode.

Advantageous Effects of Invention

According to the present invention, the transducer can reduce a decrease in sensitivity at harmonic frequencies of the resonance frequency of a diaphragm.

DESCRIPTION OF EMBODIMENTS

Embodiments of a condenser microphone unit according the present invention (hereinafter, also simply referred to as "unit") will now be described with reference to the accompanying drawings. The condenser microphone unit is an example of the condenser type electroacoustic transducers. It means "condenser type electroacoustic transducer", sometimes referred to as "capacitive transducer".

Condenser Microphone Unit (1)

Figure 1:
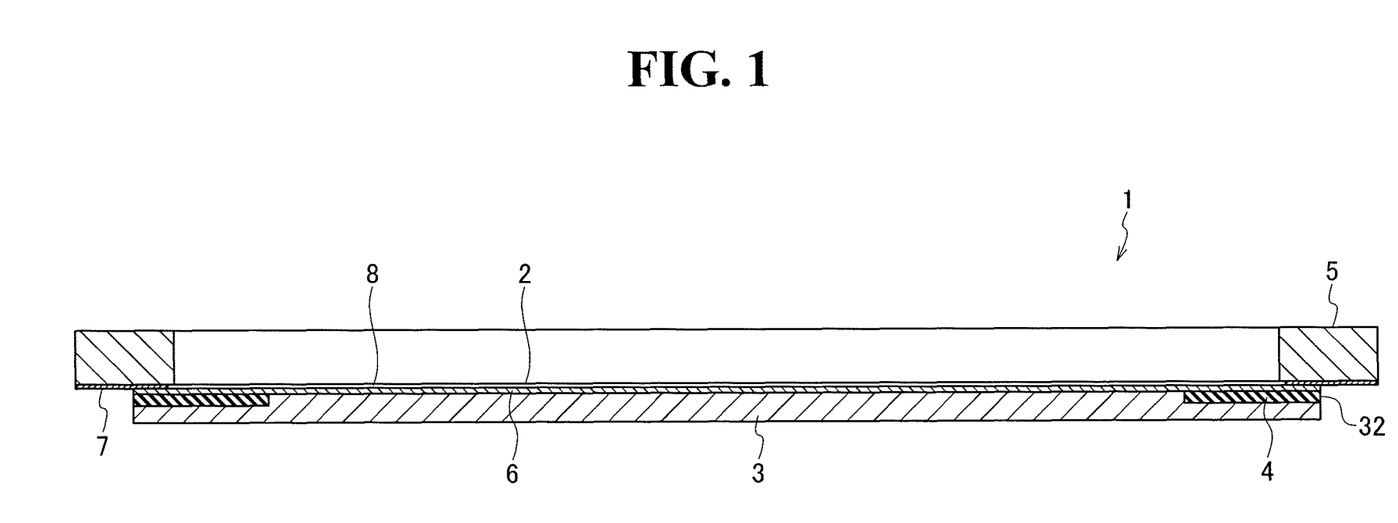
FIG. 1 is a vertical cross-sectional view illustrating a condenser microphone unit according to an embodiment of the present invention.
Figure 2:
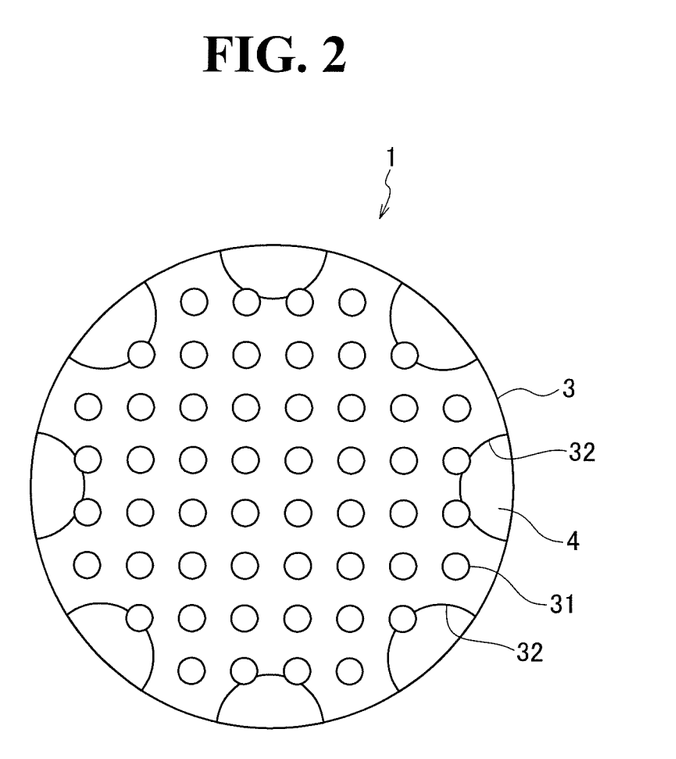
FIG. 2 illustrates a horizontal cross-section taken between a diaphragm and a fixed electrode in the condenser microphone unit.

With reference to FIGS. 1 and 2, the unit 1 is exemplified by an electret condenser microphone unit that includes a diaphragm 2, a fixed electrode 3, dielectrics 4, a diaphragm support ring 5, an electret layer 6, and a spacer 7.

The diaphragm 2 has a substantially circular shape. The outer peripheral region of the diaphragm 2 under appropriate tension is fixed to a surface of the diaphragm support ring 5. The diaphragm support ring 5 has a predetermined thickness. The other surface of the diaphragm support ring 5 is in contact with the inner wall of a case accommodating the microphone unit. The spacer 7 defines a gap 8 between the diaphragm 2 and the fixed electrode 3, and the gap width is equal to the thickness of the spacer 7.

The fixed electrode 3 has a substantially circular shape and faces the diaphragm 2 with the gap 8. The electret layer 6 is disposed on a surface, adjacent to the diaphragm 2, of the fixed electrode 3. The electret layer 6 is composed of a material that semi-permanently retains an electrical charge after application of an intense electrical field. The electret layer 6, for example, is composed of a polymeric material, such FEP.

The diaphragm 2 vibrates in response to external acoustic waves. The vibration of the diaphragm 2 causes a variation in the capacitance between the diaphragm 2 and the electret layer 6. An electrical signal corresponding to this variation is output from the output terminal of the unit 1 via an impedance converter. The electret layer 6 can be disposed at any position between the diaphragm 2 and the fixed electrode 3. The electret layer 6 may be disposed on a surface, adjacent to the diaphragm 2, of the fixed electrode 3, as in this embodiment, or may be disposed on a surface, adjacent to the fixed electrode 3, of the diaphragm 2.

With reference to FIG. 2, the fixed electrode 3 has multiple sound holes 31. The fixed electrode 3 has depressions 32. The depressions 32 are filled with the dielectrics 4. The dielectrics 4 are disposed in partial regions between the diaphragm 2 and the fixed electrode 3. The dielectrics 4 are in contact with the fixed electrode 3 and the electret layer 6. Thus, the unit 1 has a first region that does not include the dielectrics 4 between the diaphragm 2 and the electret layer 6, and a second region that includes the dielectrics 4. That is, the unit 1 includes the dielectrics 4 in partial regions between the diaphragm 2 and the fixed electrode 3.

The dielectrics 4 are composed of a material having low permittivity, such as polytetrafluoroethylene (Teflon™) or an organic polymeric material. The dielectrics 4 are disposed symmetrically about the center of the diaphragm 2. The fixed electrode 3 and the electret layer 6 constitute a capacitor in the second region.

Figure 3:
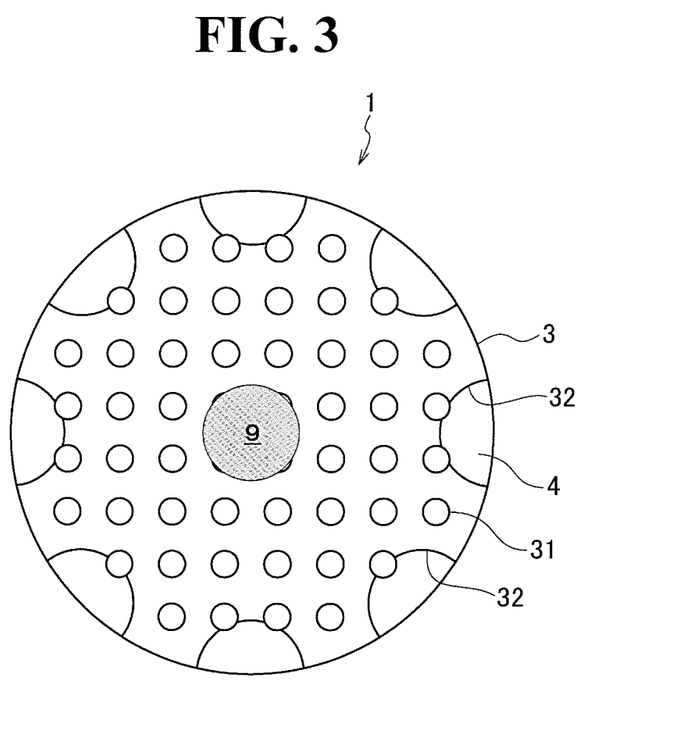
FIG. 3 illustrates a horizontal cross-section taken between a diaphragm and a fixed electrode in a condenser microphone unit according to another embodiment of the present invention.

With reference to FIG. 3, the diaphragm 2 and the fixed electrode 3 may be shaped as rings (annular). The central area of the annular diaphragm 2 is supported by a support 9.

Figure 4:
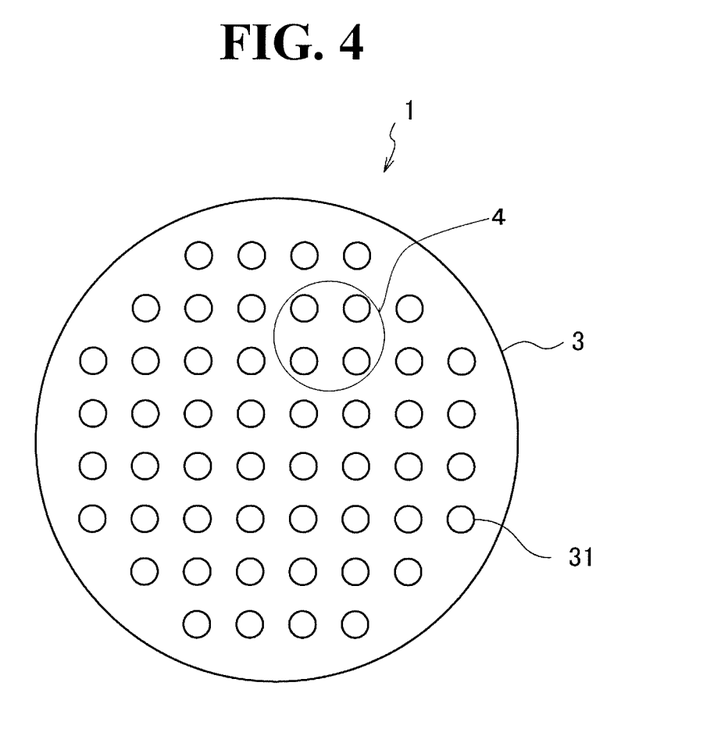
FIG. 4 illustrates a horizontal cross-section taken between a diaphragm and a fixed electrode in a condenser microphone unit according to another embodiment of the present invention.

With reference to FIG. 4, the dielectrics 4 may be disposed more inward than the edge of the diaphragm 2. The dielectrics 4 disposed more inward than the edge of the fixed electrode 3 do not satisfy the equation of vibration, which is described below. This causes unevenness in the boundary condition of the diaphragm 2. This causes the deviation of the nodes of vibration from a circle defining the shape of the diaphragm 2. This causes a reduction in resonance sharpness and results in an uneven vibration mode of the diaphragm 2. One or more dielectrics 4 may be disposed between the diaphragm 2 and the fixed electrode 3. Alternative to the symmetrical arrangement about the center of the diaphragm 2, the dielectrics 4 may be disposed in any other manner. The dielectrics 4 are appropriately arranged so as to vary the frequency response of the unit 1.

Figure 5:
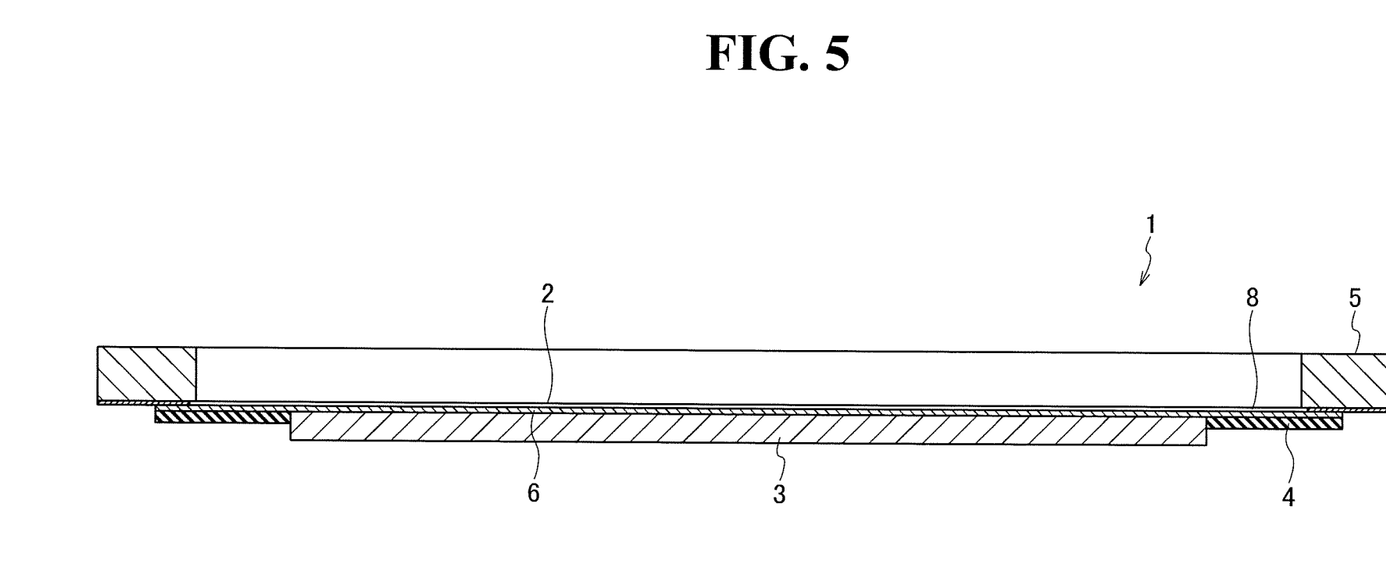
FIG. 5 is a vertical cross-sectional view illustrating a condenser microphone unit according to another embodiment of the present invention.

The surfaces of the dielectrics 4 remote from the diaphragm 2 may be exposed, as illustrated in FIG. 5. In other words, the surfaces of the dielectrics 4 remote from the diaphragm 2 may not be in contact with the fixed electrode 3. The theoretical capacitance of the capacitor in the regions containing the dielectrics 4 is zero. This establishes a frequency response of the unit 1 that differs from that of a conventional unit. This also allows the fixed electrode 3 to have a simple shape.

Relationship between Dielectrics 4 and Frequency Response

Figure 8:
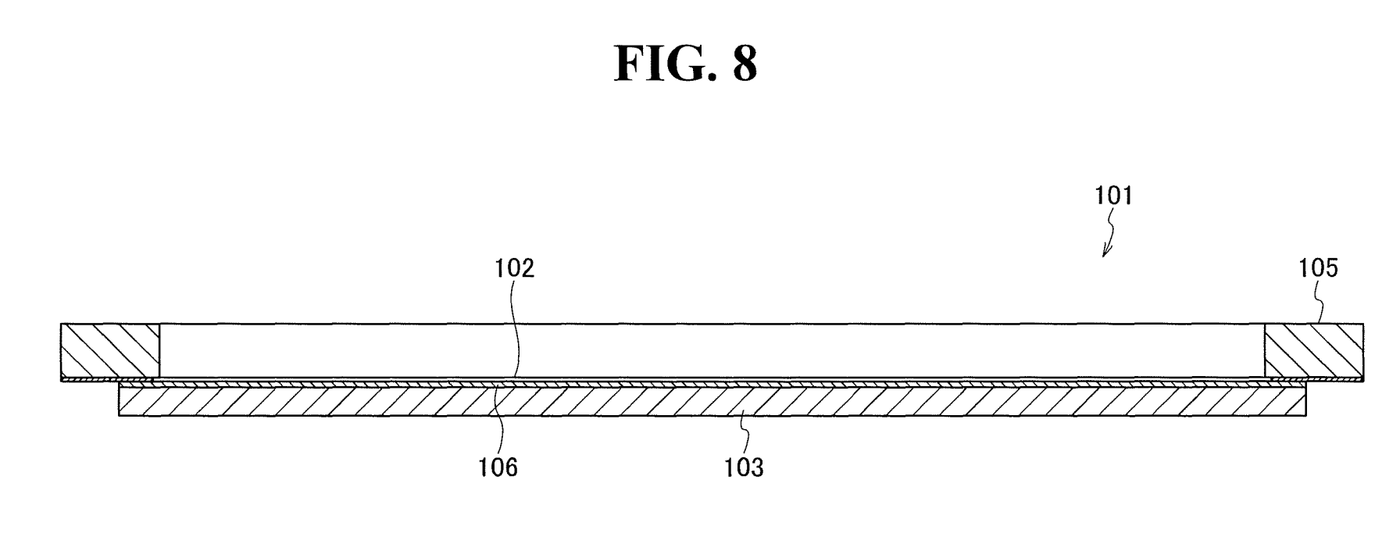
FIG. 8 is a vertical cross-sectional view illustrating a conventional condenser microphone unit.
Figure 9:
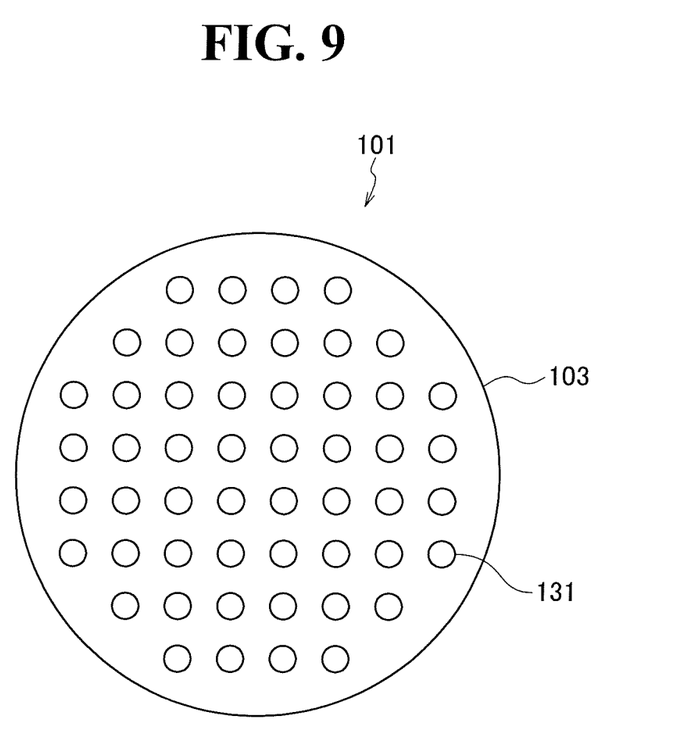
FIG. 9 illustrates a horizontal cross-section taken between a diaphragm and a fixed electrode of a condenser type electroacoustic transducer of the conventional condenser microphone unit.

A conventional condenser microphone unit 101 will now be described with reference to FIGS. 8 and 9. The condenser microphone unit 101 includes a diaphragm 102, a fixed electrode 103, and a diaphragm support ring 105. An electret layer 106 is disposed on the entire surface, adjacent to the diaphragm 102, of the fixed electrode 103. The capacitor consisting of the diaphragm 102 and the fixed electrode 103 has uniform capacitance.

The diaphragm 102 in a condenser microphone not including dielectrics 4 can be regarded as a circular film under uniform tension. The behavior of the diaphragm 102 under such tension can be determined through a two-dimensional vibration equation (Expression 1).

$$\frac{\partial^2 z}{\partial r^2} + \frac{1}{r}\frac{\partial z}{\partial r} + \frac{1}{r^2}\frac{\partial^2 z}{\partial \theta^2} = \frac{1}{c^2}\frac{\partial^2 z}{\partial t^2} \qquad \text{Expression 1}$$

where r, θ, and z are coordinates in the cylindrical coordinate system having a basis at the center of the film, c is the wave propagation rate, and t is time. The vibration equation can be solved through implementation of the boundary condition through fixing of the diaphragm support ring 105 on the film at radius a of the film. That is, the resonance frequency can be determined.

A film having a resonance frequency has at least one nodal diameter that passes through the center of the circular film and at least one nodal circle concentric with the circular film. The frequency response of the film varies in accordance with the frequency depending on the number of nodal diameters and nodal circles. Thus, a film having a resonance frequency cannot have a flat frequency characteristic. Typically, the film is designed to have a resonance frequency outside the desired frequency band or to lower the peak of the resonance through an acoustic resistor. That is, a conventional condenser type electroacoustic transducer is designed to have flat frequency characteristics.

Figure 10:
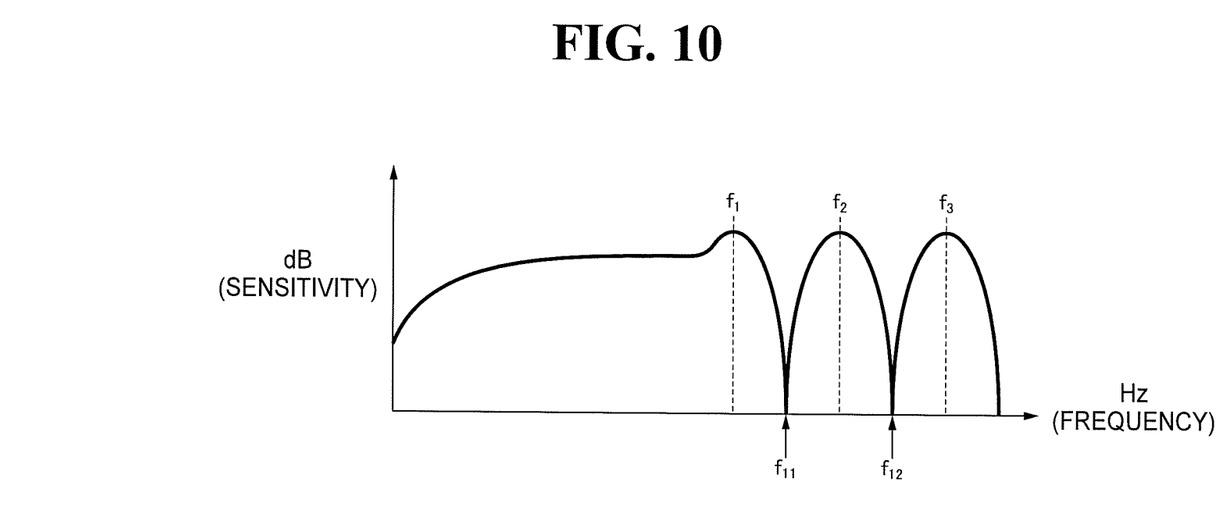
FIG. 10 is a graph illustrating the relationship between frequency and sensitivity of the condenser microphone unit in FIG. 8.

FIG. 10 illustrates the frequency response of the diaphragm 102. Sensitivity is significantly low at resonance frequencies f11 and f12. In contrast, the sensitivity is high at a frequency f2 between the resonance frequencies f11 and f12, a frequency f1, which is half the frequency f2, and a frequency f3, which is twice the frequency f2.

Relationship of Dielectrics 4 and Tension Applied to Diaphragm 2

The capacitance C of a capacitor consisting of two electrodes is represented as:

$$C = \in \times S/d$$

where ∈ is the permittivity between the two electrodes, S is the area of the opposing region of the two electrodes, and d is the distance between the two electrodes.

Figure 6:
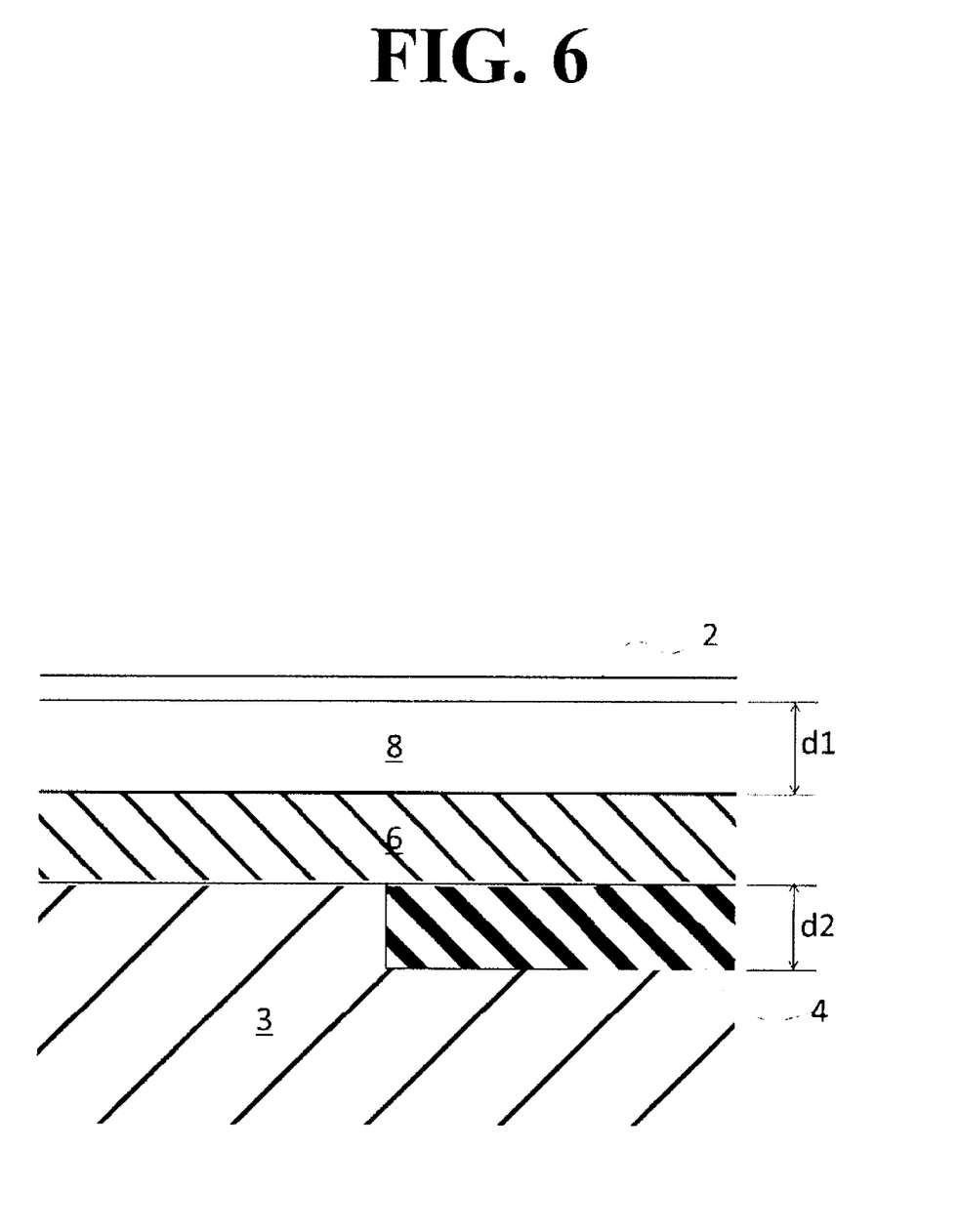
FIG. 6 is an enlarged view illustrating a cross-section taken between the diaphragm and the fixed electrode.

With reference to FIG. 6, the capacitance C1 per unit area s in the first region in this embodiment will now be described. The permittivity of the first region indicates the permittivity $\in_1$ in the gap 8 between the diaphragm 2 and the electret layer 6. The distance between the electrodes in this embodiment is equal to the width d1 of the gap 8, which is the distance between the opposing surfaces of the diaphragm 2 and the electret layer 6. Thus, the capacitance C1 in the first region is represented as C1=∈1×S/d1.

The capacitance C2 per unit area s in the second region will now be described. The capacitance C2 is the capacitance of two capacitors connected in series, one of the capacitors consisting of the diaphragm 2 and the electret layer 6, the other capacitor consisting of the electret layer 6, the fixed electrode 3, and the dielectrics 4 disposed therebetween. Capacitance C21 per unit area s between the diaphragm 2 and the electret layer 6 is identical to the capacitance C1 described above. The permittivity $\in 2$ of the dielectrics 4 determines the capacitance C22 per unit area s between the fixed electrode 3 and the electret layer 6. The distance between the electrodes is equal to the thickness d2 of the dielectrics 4. Thus, the capacitance C22 is represented as $C22=\in 2\times S/d2$.

The capacitance C2 of a capacitor consisting of a capacitor having the capacitance C21 and a capacitor having the capacitance C22 connected in series is smaller than the capacitance C1. Low permittivity $\in 2$ of the dielectrics 4 yields small capacitance C2.

The voltage V across the capacitor consisting of the diaphragm 2 and the fixed electrode 3 is represented as:

$$V=Q/C$$

where Q is the charge in the electret layer 6. In this embodiment, Q is a constant. Thus, the voltage V2 in the second region is larger than the voltage V1 in the first region. The electrostatic attraction between the diaphragm 2 and the fixed electrode 3 in the first region is larger than that in the second region. Thus, non-uniform tension is applied to the diaphragm 2 according to this embodiment.

Figure 7:
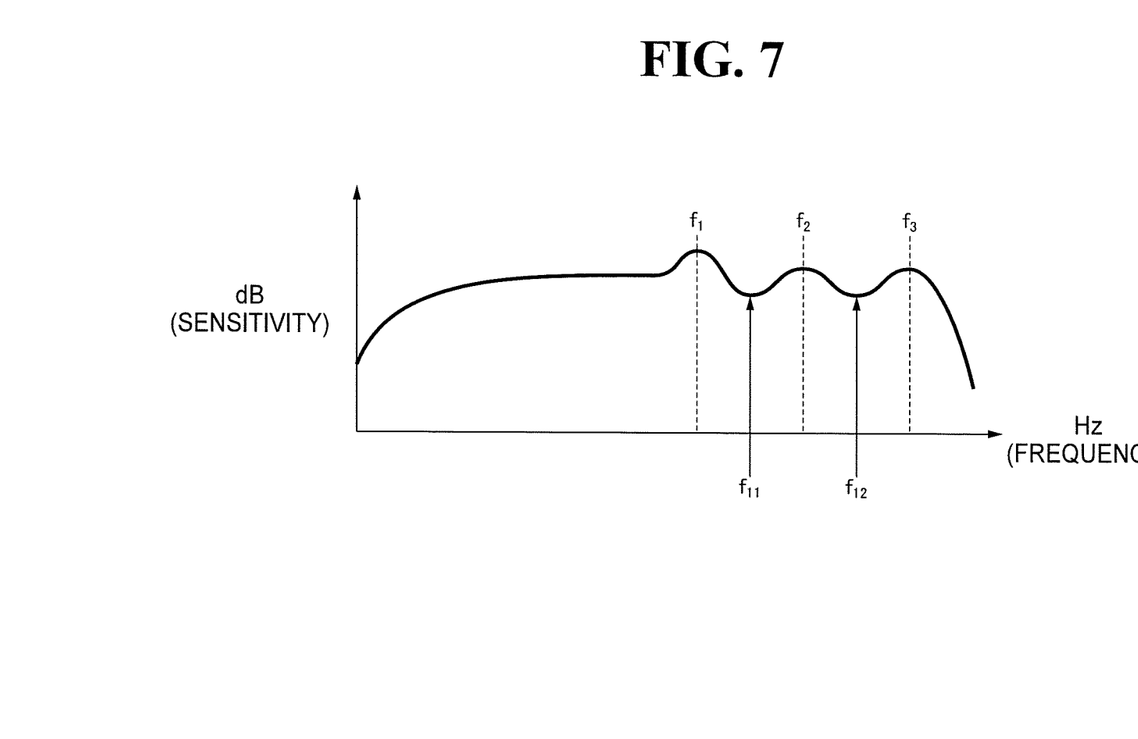
FIG. 7 is a graph illustrating the relationship between frequency and sensitivity of the condenser microphone unit in FIG. 1.

The non-uniform tension applied to the diaphragm 2 causes the unit 1 to have low resonance sharpness (Q value) because the two-dimensional vibration equation and the boundary condition cannot be applied. Thus, the peak of the resonance frequency can be lowered. As a result, as shown in FIG. 7, the sensitivity to the resonance frequencies f11 and f12 is maintained at a higher level than that of the conventional example shown in FIG. 10.

The disposition of the dielectrics 4 in partial regions between the diaphragm 2 and the fixed electrode 3 varies the behavior of the diaphragm 2 to establish a condenser microphone unit that has a predetermined frequency response.

The dielectrics 4 may be disposed near the edge of the diaphragm 2. This prevents the generation of nodal lines and nodal circles at specific frequencies because the boundary condition of the vibration equation does not hold. That is, a decreased in sensitivity can be reduced at harmonic frequencies of the resonance frequency.

This embodiment describes a condenser microphone unit. Alternatively, the present invention can be applied to a condenser type electroacoustic speaker. A condenser microphone including an electret is described in this embodiment. The same advantageous effects can be achieved through a DC-bias condenser microphone unit.

According to the embodiment described above, dielectrics are disposed in partial regions between a diaphragm and a fixed electrode. This configuration can reduce a decrease in sensitivity at harmonic frequencies of the resonance frequency of the diaphragm.

What is claimed is:

1. A condenser type electroacoustic transducer comprising:
    a diaphragm;
    a fixed electrode having a surface facing the diaphragm;
    at least one dielectric disposed in a partial region on the surface of the fixed electrode; and
    an electret layer disposed between the diaphragm and the fixed electrode,
    wherein the fixed electrode has at least one depression, and the at least one depression is filled with the at least one dielectric.

2. The condenser type electroacoustic transducer according to claim 1, wherein the dielectric is disposed between the electret layer and the fixed electrode.

3. The condenser type electroacoustic transducer according to claim 1, wherein the dielectric is disposed at a position homologous to an edge portion of the diaphragm.

4. The condenser type electroacoustic transducer according to claim 1, wherein the dielectric is disposed more inward than a position homologous to an edge portion of the diaphragm.

5. The condenser type electroacoustic transducer according to claim 1, wherein the dielectric comprises a plurality of dielectrics disposed symmetrically about the center of the diaphragm on an edge portion of the diaphragm.

6. The condenser type electroacoustic transducer according to claim 1, wherein the dielectric comprises a plurality of dielectrics disposed symmetrically about the center of the diaphragm more inward than an edge portion of the diaphragm.

7. The condenser type electroacoustic transducer according to claim 1, wherein the diaphragm has a circular shape.

8. The condenser type electroacoustic transducer according to claim 1, wherein an electrostatic attraction between the diaphragm and the fixed electrode is not uniform.

9. The condenser type electrostatic transducer according to claim 1, wherein a surface of the at least one dielectric remote from the diaphragm is exposed.

10. A condenser type electroacoustic transducer comprising:
    a diaphragm;
    a fixed electrode having a surface facing the diaphragm;
    an electret layer disposed between the diaphragm and the fixed electrode; and
    at least one dielectric disposed in a partial region between the electret layer and the fixed electrode on the surface of the fixed electrode,
    wherein the fixed electrode has at least one depression, and the at least one depression is filled with the at least one dielectric.

11. The condenser type electroacoustic transducer according to claim 10, wherein the dielectric is disposed in an edge portion of the diaphragm.

12. The condenser type electroacoustic transducer according to claim 10, wherein the dielectric is disposed more inward than an edge portion of the diaphragm.

13. The condenser type electroacoustic transducer according to claim 10, wherein the dielectric comprises a plurality of dielectrics disposed symmetrically about the center of the diaphragm on an edge portion of the diaphragm.

14. The condenser type electroacoustic transducer according to claim 10, wherein the dielectric comprises a plurality of dielectrics disposed symmetrically about the center of the diaphragm more inward than an edge portion of the diaphragm.

15. The condenser type electroacoustic transducer according to claim 10, wherein the diaphragm has a circular shape.

* * * * *